United States Patent [19]
Kawachi et al.

[11] Patent Number: 5,207,204
[45] Date of Patent: May 4, 1993

[54] METHOD OF AND AN APPARATUS FOR SUPPLYING ASSIST AIR INTO A COMBUSTION CHAMBER DIRECT INJECTING FUEL INJECTION VALVE

[75] Inventors: Katsuyoshi Kawachi; Kazumitsu Kobayashi, both of Isesaki, Japan

[73] Assignee: Japan Electronic Control Co., Ltd., Isesaki, Japan

[21] Appl. No.: 942,839

[22] Filed: Sep. 10, 1992

[30] Foreign Application Priority Data

Sep. 10, 1991 [JP] Japan .................................. 3-258515

[51] Int. Cl.⁵ ........................................ F02M 23/00
[52] U.S. Cl. ..................................... 123/533; 123/435
[58] Field of Search ...................... 123/435, 533, 585

[56] References Cited
U.S. PATENT DOCUMENTS 4,984,540  1/1991  Morikawa ............... 123/533
5,016,598  5/1991  Kushibe et al. ......... 123/533

FOREIGN PATENT DOCUMENTS 1-166270  5/1988  Japan .
2-64258   8/1988  Japan .

Primary Examiner—Noah P. Kamen
Attorney, Agent, or Firm—Foley & Lardner

[57] ABSTRACT

An engine has a combustion chamber and a fuel injection valve for directly injecting a fuel into the combustion chamber. An assist air supplying apparatus supplies assist air to atomize the fuel injected by the fuel injection valve. Assist air supply pressure is controlled so that a given pressure difference is secured between the assist air supply pressure and pressure in the combustion chamber. The assist air, therefore, is supplied under proper pressure for an entire period of fuel injection, to adequately micronize the injected fuel and improve combustion efficiency.

8 Claims, 4 Drawing Sheets

METHOD OF AND AN APPARATUS FOR SUPPLYING ASSIST AIR INTO A COMBUSTION CHAMBER DIRECT INJECTING FUEL INJECTION VALVE

BACKGROUND OF THE INVENTION

(1) Field of the Invention

The present invention relates to a method of and an apparatus for supplying assist air into a combustion chamber direct injecting fuel injection valve of, for example, a vehicle engine, to micronize a fuel directly injected into a combustion chamber of the engine by the fuel injection valve.

(2) Description of the Related Art

A combustion chamber direct injecting fuel injection valve according to a prior art for a vehicle engine faces a combustion chamber of the engine. A fuel injected by the fuel injection valve is mixed with and micronized by assist air and enters the combustion chamber.

According to the prior art, pressure for supplying the assist air is kept constant. When a suction valve of the combustion chamber is opened, this pressure is sufficiently larger than pressure in the combustion chamber. Namely, a large pressure difference is secured between the assist air supplying pressure and the combustion chamber pressure. As ignition timing approaches after the suction valve is closed, the pressure difference rapidly decreases and becomes nearly zero just before the fuel injection valve stops injecting the fuel.

Namely, according to the prior art, the combustion chamber pressure rises during the latter period of fuel injection of the fuel injection valve, to drop the pressure difference between the combustion chamber pressure and the assist air supply pressure, to thereby deteriorate the fuel micronization effect of the assist air and the combustion efficiency of an air-fuel mixture in the combustion chamber.

SUMMARY OF THE INVENTION

To solve these problems of the prior art, an object of the invention is to effectively micronize a fuel with assist air for an entire period of fuel injection.

Another object of the invention is to promote micronization of a fuel and improve the combustion efficiency of an air-fuel mixture.

In order to accomplish these objects, the invention provides a method of and an apparatus for supplying assist air into a combustion chamber direct injecting fuel injection valve of an engine, which detect pressure in a combustion chamber of the engine, and according to the detected pressure, control pressure of the assist air supply, the assist air being supplied to atomize a fuel that is injected directly into the combustion chamber by the fuel injection valve.

This arrangement variably controls the assist air supplying pressure in response to changes in the combustion chamber pressure, so that the assist air is stably supplied under proper pressure during a fuel injection period.

The invention may keep the assist air supplying pressure higher than the combustion chamber pressure by a given pressure difference. Namely, the invention increases the assist air supplying pressure when the combustion chamber pressure rises before ignition, thereby maintaining the given pressure difference between the assist air supplying pressure and the combustion chamber pressure for an entire period of supplying assist air.

The means for controlling the assist air supplying pressure may comprise a pressure control valve disposed in an air pipe for connecting an assist air inlet of the fuel injection valve to an assist air supply source.

The pressure control valve may comprise a proportional control solenoid valve. This valve is controlled according to a signal from a pressure sensor that detects the combustion chamber pressure, to properly control the assist air supplying pressure.

The pressure control valve may comprise a pressure regulator responsive to the combustion chamber pressure. A valve plug of the pressure regulator is designed to open at a pressure that is higher than the combustion chamber pressure by a given value, to thereby release extra assist air. As a result, the assist air supply pressure is controlled to the valve plug opening pressure, to maintain the predetermined pressure difference between the assist air supplying pressure and the combustion chamber pressure.

The pressure control means may control a voltage applied to an electric motor that drives an air pump serving as the assist air supply source. By controlling the applied voltage, discharge pressure of the air pump is controlled to properly regulate the assist air supplying pressure.

Other objects and features of the invention will be described by way of preferred embodiments with reference to accompanying drawings. The present invention, however, is not limited to the embodiments, and other embodiments and modifications of the invention are possible without departing from the spirit or essential features thereof.

DESCRIPTION OF THE PREFERRED EMBODIMENTS

Figure 1:
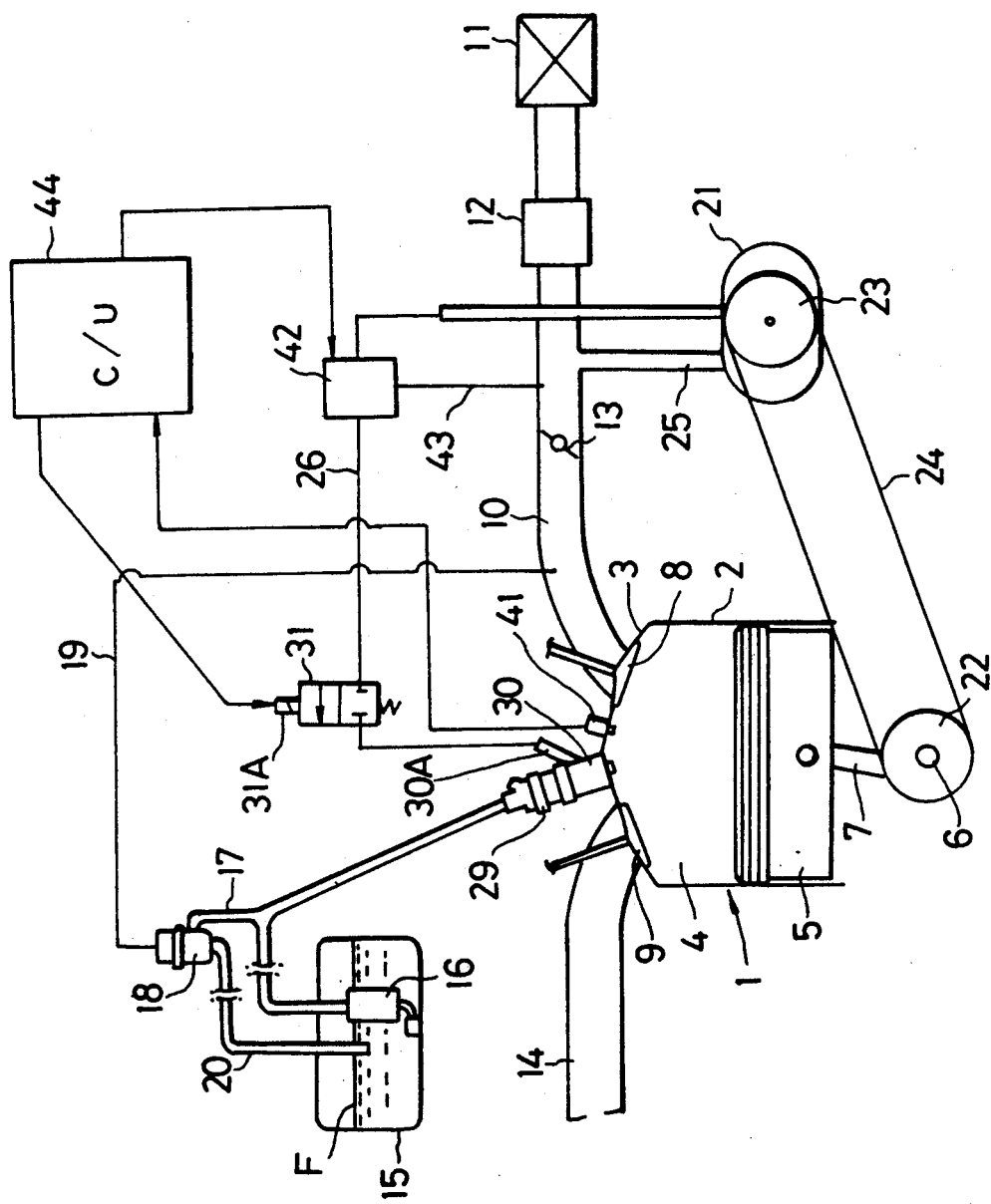
FIG. 1 is a schematic view showing an assist air supplying apparatus according to a first embodiment of the invention.

In FIG. 1, a vehicle engine 1 comprises, for example, four cylinders 2 (only one cylinder is shown), a cylinder head 3 mounted on each cylinder 2, a piston 5 reciprocating in the cylinder 2 and defining a combustion chamber 4 between the cylinder 2 and the cylinder head 3, and a connection rod 7 for connecting the piston 5 to a crankshaft 6, to convert a reciprocative motion of the piston 5 into a rotational motion of the crankshaft 6. The cylinder head 3 has a suction valve 8 and an exhaust valve 9.

The suction side of the cylinder head 3 is connected to an intake pipe 10. The intake pipe 10 involves an intake manifold, an air cleaner 11, an airflow meter 12, a throttle valve 13, etc. The exhaust side of the cylinder head 3 is connected to an exhaust pipe 14. The exhaust pipe 14 includes an exhaust manifold, etc., to discharge an exhaust gas from the combustion chamber 4 to the outside when the exhaust valve 9 is opened.

A fuel tank 15 is arranges at, for example, a rear part of the vehicle. The fuel tank 15 has a fuel pump 16. The fuel pump 16 feeds a fuel F from the fuel tank 15 into a supply pipe 17. The fuel is injected by a fuel injection valve 29 into the combustion chamber 4. The supply pipe 17 has a pressure regulator 18 of adjusting fuel pressure in the supply pipe 17. The pressure regulator 18 receives intake air pressure from the intake pipe 10 through a control pressure pipe 19, adjusts fuel pressure according to the intake air pressure, and returns an excess of the fuel F to the fuel tank 15 through a return pipe 20.

The combustion chamber direct injecting fuel injection valve 29 mounted on the cylinder head 3 faces the combustion chamber 4. The fuel injection valve 29 incorporates a solenoid actuator (not shown). An end of the fuel injection valve 29 forms an injection nozzle (not shown) around which a bottomed cylindrical cover 30 is disposed to define an air chamber (not shown). The cover 30 has an air introduction member 30A for introducing assist air into the air chamber. The air introduction member 30A is connected to an air pipe 26, which is connected to the discharge side of an air pump 21.

The air pump 21 serves as an assist air supply source and is driven by the crankshaft 6 through pulleys 22 and 23 and a belt 24. The air pump 21 draws intake air from the intake pipe 10 though an air pipe 25 and discharges it into the air pipe 26, thereby supplying assist air into the fuel injection valve 29.

When the injection nozzle of the fuel injection valve 29 injects a fuel into the combustion chamber 4 of the engine 1, the assist air is supplied from the air introduction member 30A into the air chamber and blown toward the injected fuel. The assist air micronizes the injected fuel, so that the fuel is evenly mixed with intake air in the combustion chamber 4, to improve combustion efficiency.

A solenoid air valve 31 is disposed in the air pipe 26. When a solenoid 31A of the air valve 31 is excited, the air valve 31 is switched from a valve closed position of FIG. 1 to a valve opened position. As a result, assist air is introduced from the air pump 21 into the air chamber of the fuel injection valve 29 through the air introduction member 30A. When the solenoid 31A is demagnetized, the air valve 31 is again switched to the valve closed position, to stop supplying the assist air into the fuel injection valve 29.

Figure 2:
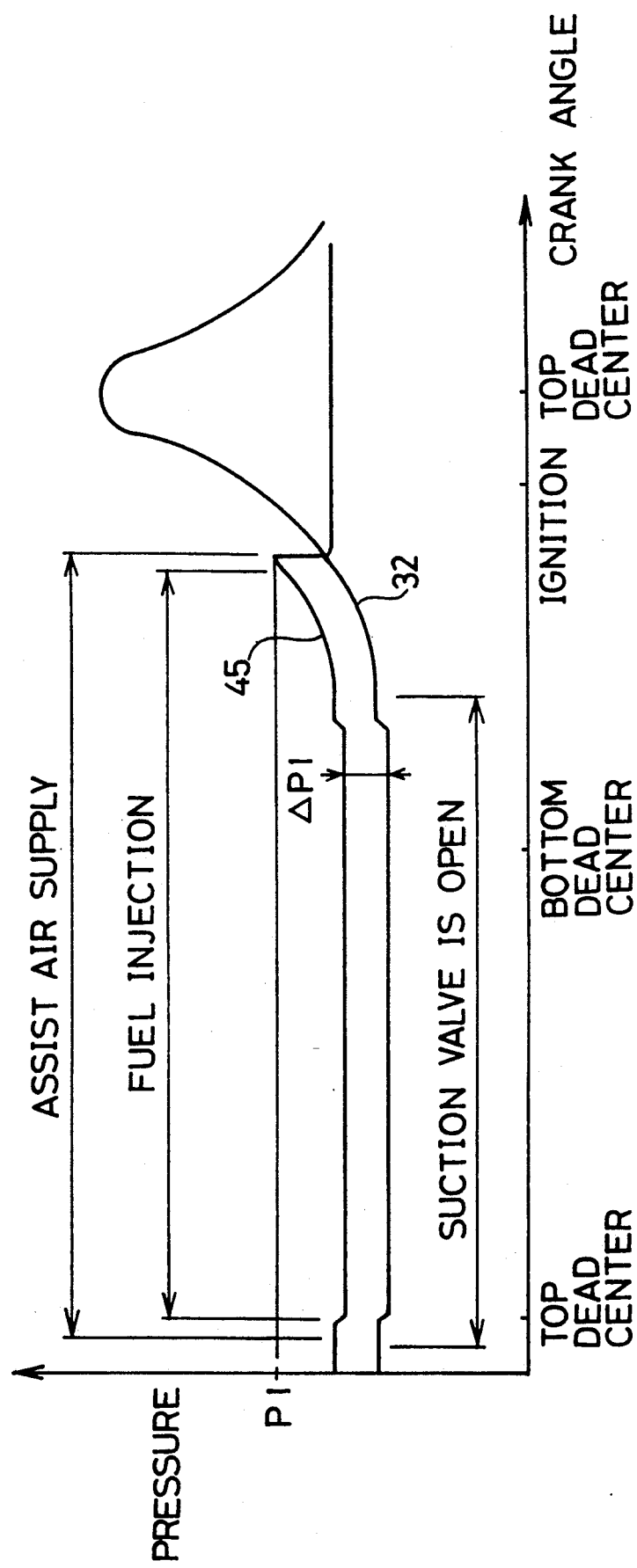
FIG. 2 is a graph showing characteristics of pressures in a combustion chamber of an engine and pressures of assist air.

The piston 5 reciprocates in the cylinder 2 of the engine 1. As shown in FIG. 2, the suction valve 8 is opened before the piston 5 reaches top dead center, to draw intake air into the combustion chamber 4 through the intake pipe 10. After a slight delay time, the air valve 31 is opened to supply assist air into the air chamber of the fuel injection valve 29, and the fuel injection valve 29 injects a fuel. The fuel is micronized by the assist air and mixed with intake air in the combustion chamber 4. After the piston 5 reaches bottom dead center and the suction valve 8 is closed, and before the piston 5 reaches top dead center, the air-fuel mixture in the combustion chamber 4 is ignited by an ignition plug (not shown) and combusted. As a result, pressure in the combustion chamber 4 rapidly increases as indicated with the characteristic curve 32 of FIG. 2. This pressure pushes the piston 5 toward bottom dead center and causes the crankshaft 6 to provide torque.

In the assist air supplying apparatus mentioned above, assist air supplying pressure controlling means according to the invention will be explained.

A pressure sensor 41 is fitted to the cylinder head 3, to face the combustion chamber 4. The pressure sensor 41 detects pressure in the combustion chamber 4, as indicated with the characteristic curve 32 of FIG. 2. A signal representing the detected pressure is provided to a control unit 44 comprising, for example, a microcomputer.

A proportional control solenoid valve 42 serving as a pressure control valve is disposed in the air pipe 26 between the air pump 21 and the solenoid air valve 31. The proportional control solenoid valve 42 is connected to the output side of the control unit 44.

According to the signal representing the pressure in the combustion chamber 4 (the characteristic curve 32 of FIG. 2) provided by the pressure sensor 41, the control unit 44 provides a control signal to the proportional control solenoid valve 42. In response to a voltage value (a current value) of the control signal, the proportional control solenoid valve 42 controls pressure in the air pipe 26, i.e., assist air supplying pressure, as indicated with a characteristic curve 45 of FIG. 2. An excess of the assist air in the air pipe 26 is returned to the intake pipe 10 through an air pipe 43.

More precisely, the proportional control solenoid valve 42 has a valve plug to open and close the air pipe 43. The control signal from the control unit 44 controls as electromagnetic force applied to the valve plug such that a pressure at which the valve plug is opened is higher, by a given value, than the pressure in the combustion chamber 4 detected by the pressure sensor 41. As a result, the assist air supplying pressure is controlled to be equal to the valve plug opening pressure and higher than the pressure in the combustion chamber 4 by the given value.

As indicated with the characteristic curve 45 of FIG. 2, the proportional control solenoid valve 42 is controlled such that, before the suction valve 8 is opened, the assist air supplying pressure is higher than changing pressure in the combustion chamber 4 by a predetermined pressure difference $\Delta P1$. When the pressure in the combustion chamber 4 slightly drops after the suction valve 8 is opened, the pressure of the assist air is lowered accordingly to maintain the pressure difference $\Delta P1$. When the pressure in the combustion chamber 4 rapidly rises after the suction valve 8 is closed, the pressure of the assist air is accordingly increased to a pressure P1, which is, for example 10 kg/cm$^2$. As a result, the pressure difference $\Delta P1$ is maintained substantially up to ignition timing.

The assist air supplying apparatus according to this embodiment is achievable on a conventional arrangement without basically changing the arrangement but only by adding the pressure sensor 41 for detecting pressure in the combustion chamber 4 and the proportional control solenoid valve 42 for controlling pressure of assist air according to the detected pressure. The arrangement of the embodiment keeps the assist air supply pressure higher than the pressure in the combustion chamber 4 by a given pressure difference $\Delta P1$. Accordingly, a fuel injected from the fuel injection valve 29 is micronized, during a whole period of fuel injection, by the assist air that is supplied with stabilized pressure difference. This surely improves the combustion efficiency of an air-fuel mixture in the combustion chamber 4.

Figure 3:
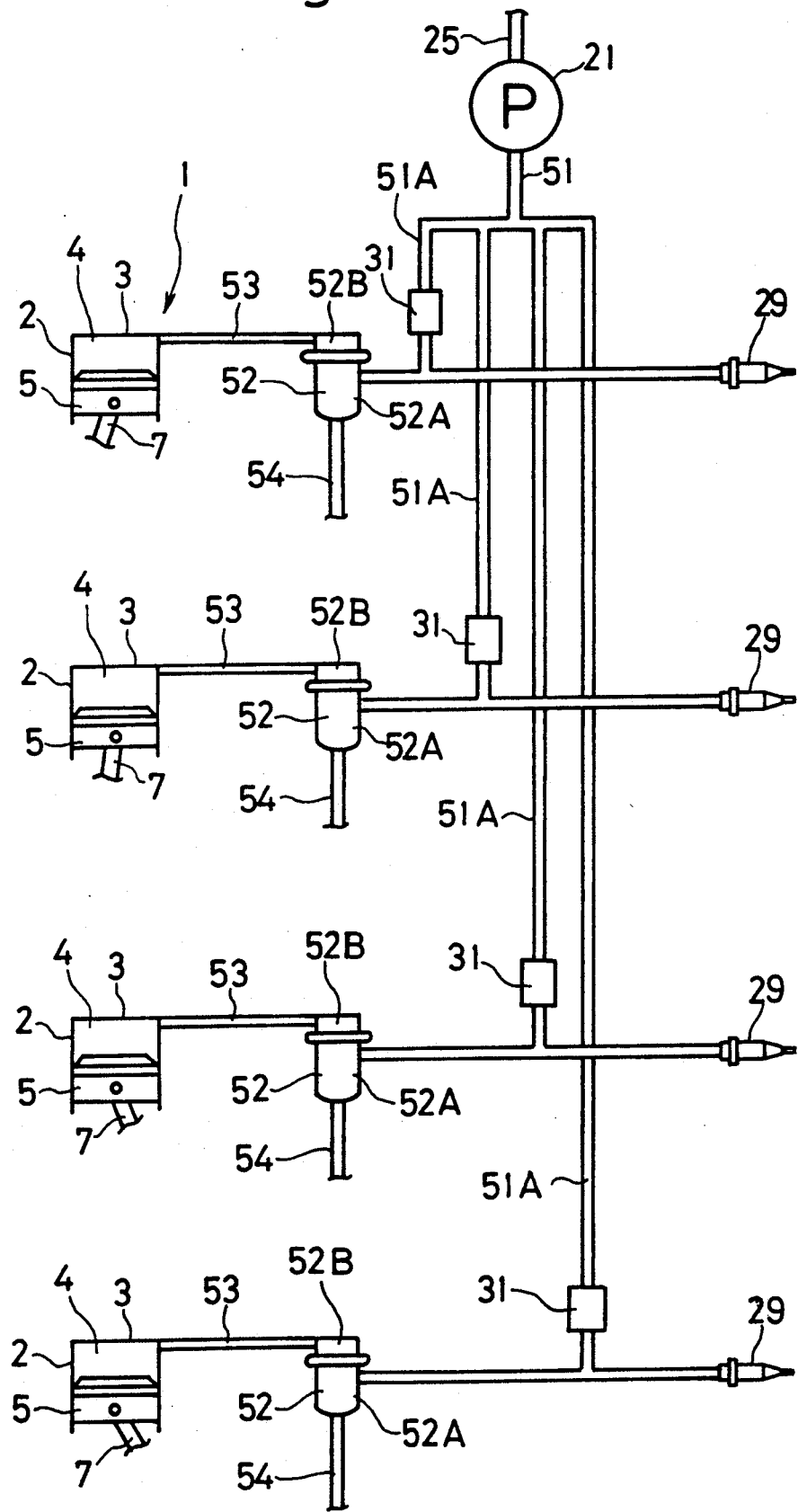
FIG. 3 is a schematic view showing an assist air supplying apparatus according to a second embodiment of the invention.

FIG. 3 shows the second embodiment of the invention.

According to this embodiment, the pressure control valve that controls assist air supplying pressure according to pressure in a combustion chamber is a pressure regulator. Namely, instead of the proportional control solenoid valve 42 of the first embodiment, the second embodiment employs the pressure regulator and omits the pressure sensor 41. Other parts of the second embodiment are the same as those of the first embodiment, and therefore, the same parts are represented with like reference marks.

In FIG. 3, the downstream side of an air pipe 51 for connecting an air pump 21 with fuel injection valves 29 is divided into four branch pipes 51A. In the middle of each of the branch pipes 51A, a solenoid air valve 31 is arranged for supplying and stopping assist air to the corresponding fuel injection valve 29.

Each branch air pipe 51A has a pressure regulator 52 serving as a pressure control valve for controlling pressure in the branch pipe 51A. Each pressure regulator 52 incorporates a metallic diaphragm (not shown) for separating the inside of the pressure regulator 52 into an air chamber 52A and a control pressure chamber 52B. The control pressure chamber 52B is connected to the inside of a corresponding combustion chamber 4 through a control pressure pipe 53. The air chamber 52A of each pressure regulator 52 has an inlet connected to the branch pipe 51A on the downstream side of the air valve 31, and an outlet connected to an intake pipe 10 through an air pipe 54.

The outlet of the air chamber 52A of each pressure regulator 52 is usually closed by a valve plug (not shown) interlocking with the diaphragm. When pressure in the air chamber 52A becomes higher than pressure in the control pressure chamber 52B, i.e., pressure in the combustion chamber 4 by ΔP1, the valve plug is opened to return an excess of assist air to the intake pipe 10 through the air pipe 54. Each pressure regulator 52 controls pressure of assist air according to the characteristic curve 45 of FIG. 2 when the air valve 31 is opened, and maintains the pressure difference ΔP1 between the pressure in the combustion chamber 4 and the assist air supply pressure for an entire period of supplying assist air. Similar to the first embodiment, a relief valve (not shown) may be provided for the air pump 21, for preventing the air pump 21 from receiving an excessive pressure of, for example, 10 kg/cm² that is greater than the pressure ΔP1.

When the flow rate of assist air discharged from the air pump 21 is Q, the flow rate of assist air supplied to each fuel injection valve 29 is about Q/10. When the suction valves 8 of the four-cylinder engine are successively opened to draw intake air into the combustion chambers 4 and when the air valves 31 are opened accordingly, air of a flow rate of 9Q/10 is returned to the intake pipe 10 from the air chamber 52A of any one of the pressure regulators 52 through the air pipe 54, if the air valves 31 are not simultaneously opened but sequentially opened one after another. In this case, the assist air of Q/10 in flow rate supplied to any one of the fuel injection valves 29 secures the pressure difference of ΔP1 with respect to the pressure in the combustion chamber 4. This pressure difference ΔP1 is set according to a spring (not shown) disposed inside the control pressure chamber 52B of each of the pressure regulators 52.

In this way, the second embodiment provides similar effect as the first embodiment, and maintains the pressure difference ΔP1 between pressure in the combustion chamber 4 and assist air supply pressure, in a range smaller than the pressure P1 even after each suction valve 8 is closed.

Although the embodiments have been explained with reference to a four-cylinder engine, the invention is applicable for other types of engines such as one-, two- and six cylinder engines, only by changing the number of the proportional control solenoid valves 42 (pressure regulators 52) according to the number of the cylinders.

In the above embodiments, the air pump 21 serving as an assist air supply source is driven by the crankshaft 6 through the pulleys 22 and 23. The air pump 21 may be driven by any other driving source such as an electric motor.

Figure 4:
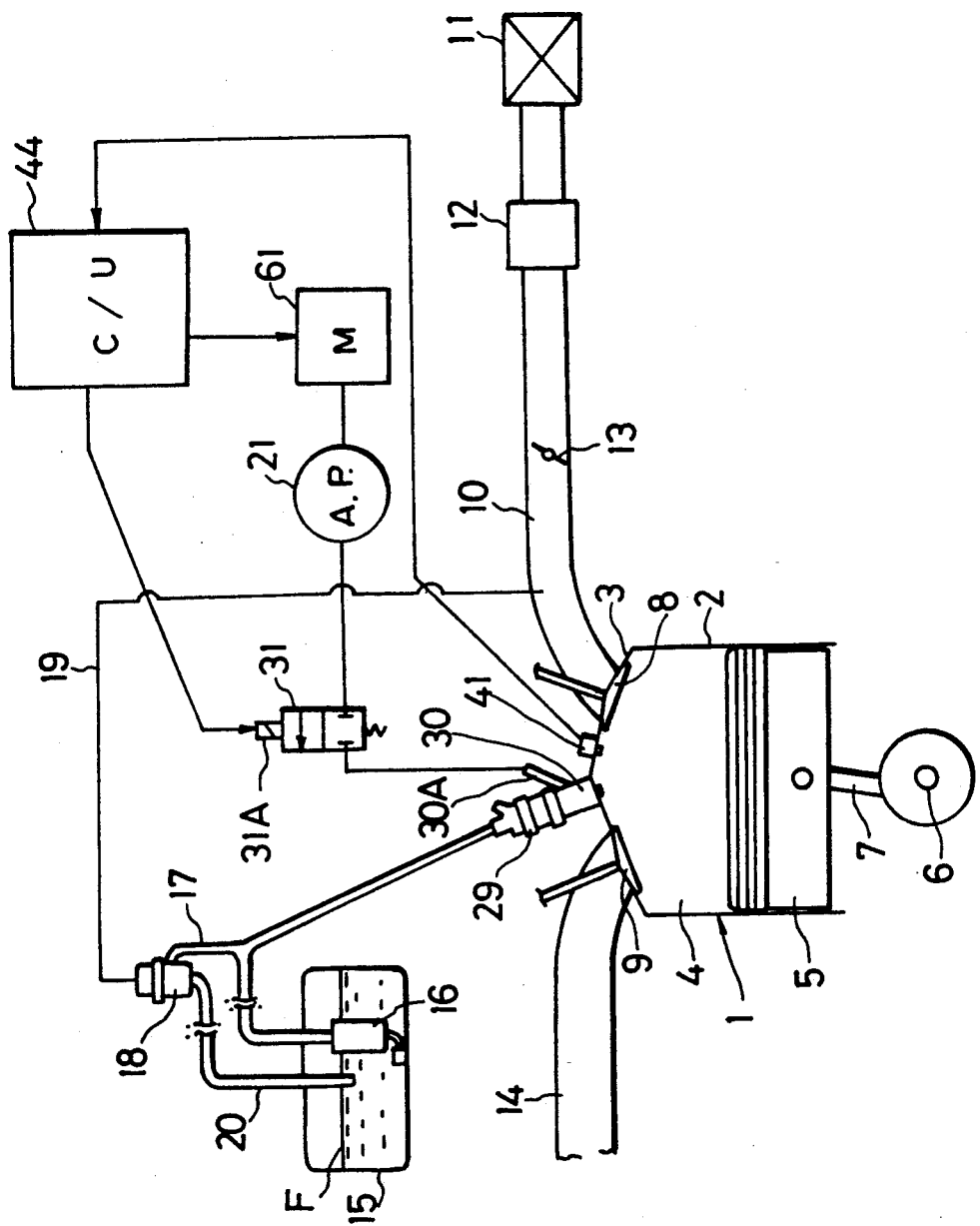
FIG. 4 is a schematic view showing an assist air supplying apparatus according to a third embodiment of the invention.

FIG. 4 shows the third embodiment of the invention that employs such an electric motor.

In the Figure, an air pump 21 is connected to a drive shaft of the electric motor 61 and driven thereby. A voltage applied to the motor 61 is variably controlled according to a control signal provided by a control unit 44. Accordingly, discharge pressure of assist air is changed in response to the rotation speed of the air pump 21.

Similar to the first embodiment, a pressure sensor 41 detects pressure in a combustion chamber 4 and provides a control unit 44 with a signal representing the detected pressure. The control unit 44 provides the motor 61 with a control signal so that the discharge pressure of assist air is higher than the detected pressure by a predetermined pressure difference ΔP1. Similar to the previous embodiments, the pressure difference ΔP1 is secured between the assist air supply pressure and the pressure in the combustion chamber 4. As a result, the assist air is stably fed during a fuel injection period, to micronize a fuel and improve combustion efficiency.

As explained above, the invention controls pressure of assist air supplied to a combustion chamber direct injecting fuel injection valve of an engine in response to pressure in a combustion chamber, to maintain a pressure difference between the assist air supplying pressure and the combustion chamber pressure up to injection timing. According to the invention, the assist air effectively micronize a fuel over an entire period of fuel injection. The fuel is, therefore, evenly mixed with intake air in the combustion chamber, to improve the combustion efficiency of an air-fuel mixture and remarkably reduce noxious components.

We claim:

1. A method of supplying assist air into a combustion chamber direct injecting fuel injection valve of an engine, comprising a step of detecting pressure in a combustion chamber of the engine, and a step of controlling assist air supply pressure according to the detected pressure, the assist air being supplied to atomize a fuel that is directly injected into the combustion chamber from the fuel injection valve.

2. The method according to claim 1, wherein the step of controlling the assist air supply pressure keeps the assist air supply pressure to be higher than the combustion chamber pressure by a given value.

3. An apparatus of supplying assist air into a combustion chamber direct injecting fuel injection valve of an engine, comprising the fuel injection valve disposed on the engine, for directly injecting a fuel into a combustion chamber of the engine, an air introduction member disposed on the fuel injection valve, for introducing assist air from an assist air supply source to micronize the injected fuel, an air pipe for connecting the air introduction member with the assist air supply source, and pressure control means for controlling assist air supply pressure according to pressure in the combustion chamber.

4. The apparatus according to claim 3, wherein the pressure control means controls the assist air supply pressure so that the assist air supply pressure is higher than the combustion chamber pressure by a given value.

5. The apparatus according to claim 3, wherein the pressure control means is a pressure control valve disposed in the air pipe.

6. The apparatus according to claim 5, wherein the pressure control valve is a proportional control solenoid valve for controlling the assist air supply pressure according to a signal provided by a pressure sensor that detects the combustion chamber pressure.

7. The apparatus according to claim 5, wherein the pressure control means is a pressure regulator responsive to the combustion chamber pressure, having a valve plug that is opened at a pressure that is higher than the combustion chamber pressure by a set value, to release an excess of the assist air, thereby controlling the assist air supply pressure to be substantially equal to the pressure at which the valve plug is opened.

8. The apparatus according to claim 3, wherein the pressure control means controls a voltage applied to an electric motor for driving an air pump serving as the assist sir supply source, thereby controlling discharge pressure of the air pump and thus the assist air supply pressure.

* * * * *